United States Patent [19]
Duperon

[11] Patent Number: 5,425,875
[45] Date of Patent: Jun. 20, 1995

[54] SCREEN SCRAPER FOR TRASH RACKS

[75] Inventor: Terry L. Duperon, Saginaw, Mich.

[73] Assignee: Learman & McCulloch and Reising, Ethington, Barnard, Perry & Milton, Saginaw, Mich.

[21] Appl. No.: 247,183

[22] Filed: May 20, 1994

[51] Int. Cl.⁶ .......................................... B01D 29/64
[52] U.S. Cl. .................................. 210/159; 210/162; 210/413
[58] Field of Search ................ 210/158, 159, 162, 413

[56] References Cited

U.S. PATENT DOCUMENTS

| | | | |
|---|---|---|---|
| 2,307,601 | 1/1943 | Nichols | 210/159 |
| 3,018,893 | 1/1962 | Collie et al. | 210/159 |
| 3,190,448 | 6/1965 | Johnston et al. | 210/159 |
| 4,447,324 | 5/1984 | Jackson | 210/159 |
| 4,521,306 | 6/1985 | Day | 210/159 |
| 4,709,804 | 12/1987 | Duperon | 210/158 |

FOREIGN PATENT DOCUMENTS 1278954 9/1968 Germany.

Primary Examiner—Christopher Upton
Attorney, Agent, or Firm—Learman & McCulloch

[57] ABSTRACT

Apparatus for scraping debris from a trash rack occupying a position in a flowing stream has a driven, upper turning drum and a pair of chains trained about the drum and carrying scraper blades which engage and carry debris on the upstream side of the rack upwardly for disposal. Each chain is composed of a plurality of links joined at their ends by pivot connections which limit the pivotal movement of the links from positions of linear prolongation in such manner as to avoid the necessity of a lower turning drum. By supporting the chain from an upper drum only, the lower parts of the chain are movable freely in directions away from and toward the rack, as well as vertically.

11 Claims, 4 Drawing Sheets

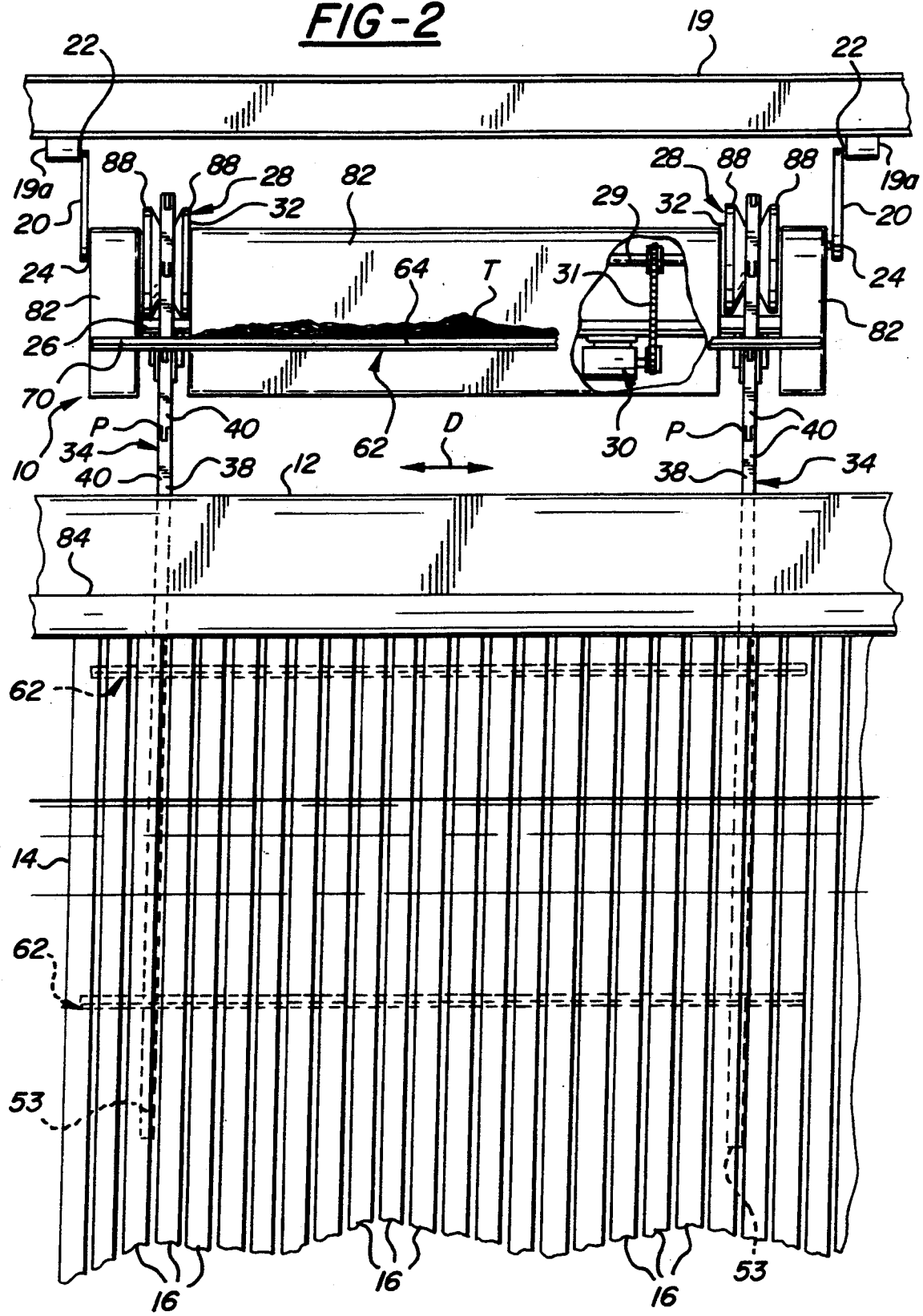

SCREEN SCRAPER FOR TRASH RACKS

This invention relates to a screen scraper for trash racks of the type adapted to be installed in a stream of flowing water upstream of a pump or other apparatus to be protected from trash which could injure the pump or other apparatus, and more particularly to apparatus for cleaning accumulated debris from the upstream side of the trash rack.

BACKGROUND OF THE INVENTION

Canals, drainage ditches, irrigation channels, and the like frequently are contaminated with debris such as tree limbs, grass clippings, leaves, tires, beverage containers, plastic and textile bags, and various other kinds of trash. If such debris is permitted to enter a pump or other water treating apparatus, such apparatus could be seriously damaged. It is the practice, therefore, to protect such apparatus by mounting a stationary trash-collecting rack or screen in the stream of water upstream of the apparatus to be protected. Such a rack or screen, however, can become so clogged with trash and other debris as to prevent or severely restrict the flow of water through the rack to the pump or other apparatus.

To minimize the effects of rack clogging, it is customary to provide a mechanism for preventing the accumulation of debris on the screen. The known forms of anticlogging mechanisms employ a plurality of chains supported at their upper and lower ends by drums mounted on a rigid framework integral with the trash rack and supporting traveling debris-engaging fingers. Such a mechanism is disclosed in U.S. Pat. No. 4,709,804. Although this anticlogging mechanism functions well for its intended purpose, it does not remove debris which is of such nature as to slip by the chains and become plastered on the screen. That is, such mechanism does not perform a screen cleaning function.

SUMMARY OF THE INVENTION

A trash screen cleaning apparatus constructed in accordance with the invention comprises an upper rotatable drum around which at least a pair of endless chains are trained to form spaced apart upwardly and downwardly movable runs. The drum is driven in a direction to move the runs in their upward and downward directions, respectively. Secured to the chains at longitudinally spaced apart intervals is a plurality of trash supports for engaging any trash that may have accumulated on the upstream side of a stationary trash screen.

Each chain comprises a plurality of links joined at their adjacent ends by pivot connections which have abutments that confront one another to limit the range of relative pivotal movement of the adjacent links and maintain the runs in laterally spaced relation to one another, even when the runs are inclined to vertical.

The chain construction obviates the need for a complex framework and the heretofore required lower turning drum for the chain, thereby enabling the achievement of substantial savings. There need be no framework below the waterline, thereby reducing corrosion. The apparatus may be fitted to an existing trash collecting screen with little or no modification of the screen.

Improved flexibility also is achieved over the known cleaning mechanisms since the conveyor chains are freely suspended from the upper drive drum and not restrained at their lower end by a sprocket or drum. This permits the chains to deflect in a direction away from the trash screen to accommodate oversized objects between the chains and the screen.

In a preferred embodiment of the invention the upper drum is swingable in directions upstream and downstream to assist in the accommodation of large objects which might otherwise become jammed between the cleaning apparatus and screen and cause the cleaning apparatus to stall or become damaged.

THE DRAWINGS

A presently preferred embodiment of the invention is disclosed in the accompanying drawings, wherein:

FIG. 2 is an end elevational view of the apparatus;

DETAILED DESCRIPTION

Figure 1:
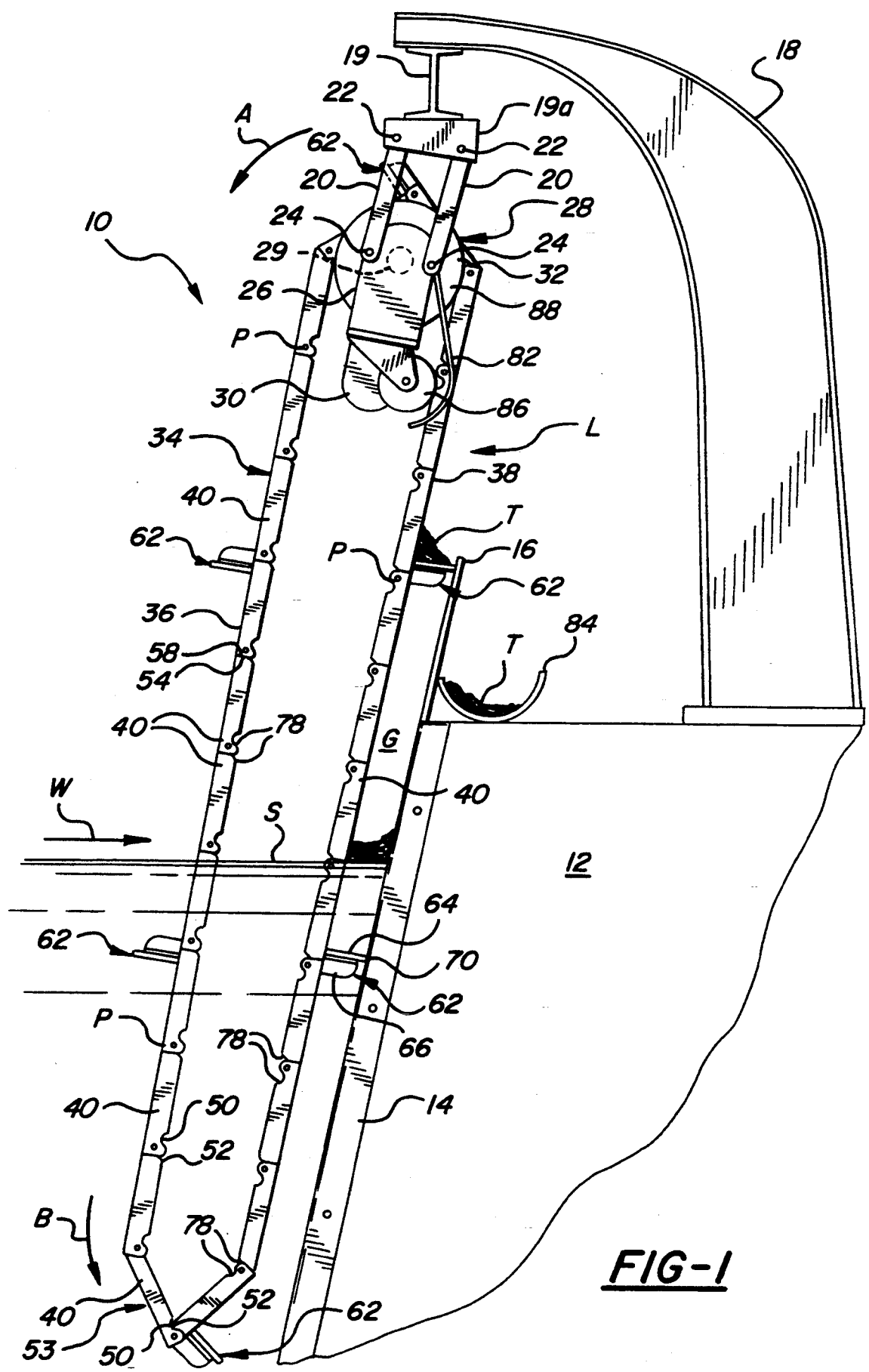
FIG. 1 is a side elevational view of the apparatus mounted in an operable position upstream of a trash screen.

Screen cleaning apparatus constructed in accordance with the disclosed embodiment of the invention is indicated generally by the reference numeral 10 and is shown in the drawings as being installed in a flowing stream of water S and upstream from a stationary pump house 12 having a pump (not shown) therein. The pump house 12 also is positioned in the stream of water which flows in the direction of the arrow W in FIG. 1. The pump house has an opening in its upstream side through which water from the stream may enter. Upstream of the pump is a screen or grid 14 having a plurality of rods or bars 16 that are spaced from one another a distance sufficient to enable water to flow freely through the screen, but block the passage of debris that could damage the pump. As illustrated in FIG. 1, the upstream side of the screen 14 is generally upright and planar, but inclined to the vertical upwardly and in the direction of flow W.

The screen cleaning apparatus 10 comprises a pair of spaced apart, upstanding supports 18 mounted atop the pump house 12 and supporting a horizontal cross beam 19. The cross beam 19 is provided with angled mounting brackets 19a which mount a pair of parallel hanger arms 20 of equal length. Each hanger arm is pivoted at its upper end to the associated bracket as at 22 and at its lower end by a pin 24 to a housing or carriage 26 which provides support for a rotary drum 28. The drum 28 has a rotary shaft 29 defining an axis of rotation and journaled at its ends by the carriage 26. The drum is rotated in the direction of arrow A by an electric motor 30 and a sprocket chain drive assembly 31 carried by the housing 26.

The shaft 29 has fixed thereto an identical pair of spaced apart sprockets 32 around each of which is trained an endless chain 34 of identical construction. Each chain forms a closed loop L having upward and downward flights or runs 36, 38, respectively, that are generally linear and approximately parallel and drivingly coupled to the sprockets 32 as will be described in greater detail below.

Each chain 34 includes a plurality of elongate, rigid bar links 40 that are joined end-to-end by pivot connections P constructed to limit relative movement of the links in one direction only from a position in which the links are in linear prolongation of each other. A preferred construction for the pivot connection is a knuckle joint formed in part by a yoke at the leading end of each link defined by a pair of spaced apart loops 42 and between which is accommodated a corresponding hinge loop 44 on the trailing edge of the adjacent link. The interleaved hinge loops 42 and 44 have aligned eyes or apertures accommodating a pivot pin 46 for hinging the adjacent links to one another.

The knuckle joints permit two adjacent links 40 to pivot freely relatively to one another in one direction only (see the arrow B in FIG. 1) from a position in linear prolongation of one another. Such pivotal movement is limited by engagement between first abutment surfaces 50, 52 on each adjacent pair of links and so positioned as to engage one another when the links are moved to an extreme position.

Additional abutments are provided on the confronting ends of each adjacent pair of links and limit the pivotal movement of the links in the opposite direction beyond a point where the adjacent links extend generally in linear prolongation of one another. Specifically, end abutments 54 and 56 of the hinge projections 42, 44 are positioned to engage corresponding abutments 58 and 60 of adjacent links when two adjacent links are moved to the position of linear prolongation.

The interleaved relationship between the parts of the knuckle joints 42, coupled with the abutments on opposite sides of each projection 44, ensures that two adjacent links can pivot in only one direction from the position of linear prolongation. Consequently, the downward run 36 may transition at the bottom 53 of the loop L to the upward run without any drum or other device being located between the runs at the bottom of the loop. Thus, the lower transition or bottom of the loop is vertically movable for reasons to be explained subsequently. The bottom of the loop normally is at a level below the surface of the stream S.

Figure 5:
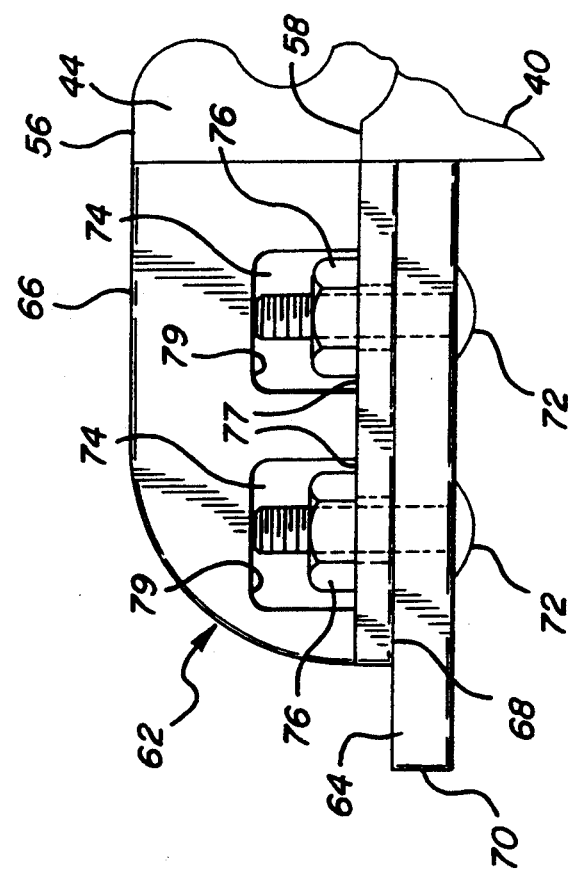
FIG. 5 is an enlarged, fragmentary side elevational view of the pivot connection between adjacent links.

A plurality of scraper blades 62 is detachably connected to the chains 34 at longitudinally spaced intervals for movement with the chains. Each scraper blade comprises a strip 64 of polyurethane or other durable material that spans and is secured to the chains 34 via integral mounting brackets 66 projecting transversely from the trailing hinge projection 44 of selected ones of the links. Each bracket 66, shown in detail in FIG. 5, has an upstanding wall 68 perpendicular to the chain 34. Each scraper blade 64 bears against the wall 68 and terminates in a free edge 70 so as to be able to bear against the screen. Each blade 64 is secured to its mounting bracket 66 by threaded fasteners 72 passing through aligned apertures in the blade and wall 68, with the heads of the fasteners 72 confronting the underside of the blade 64 to capture the blade between the head and the wall 68. The threaded shank of each fastener extends into an open pocket 74 and is provided with a nut 76. The nut 76 may be tightened against the front surface 77 of the pocket 74 to force the free end of the shank tightly against the back wall 79 of the pocket to lock the fastener 72 detachably to the mounting bracket 66. Each blade 64 is free to flex and bend without loosening the fastener 72.

Figure 4:
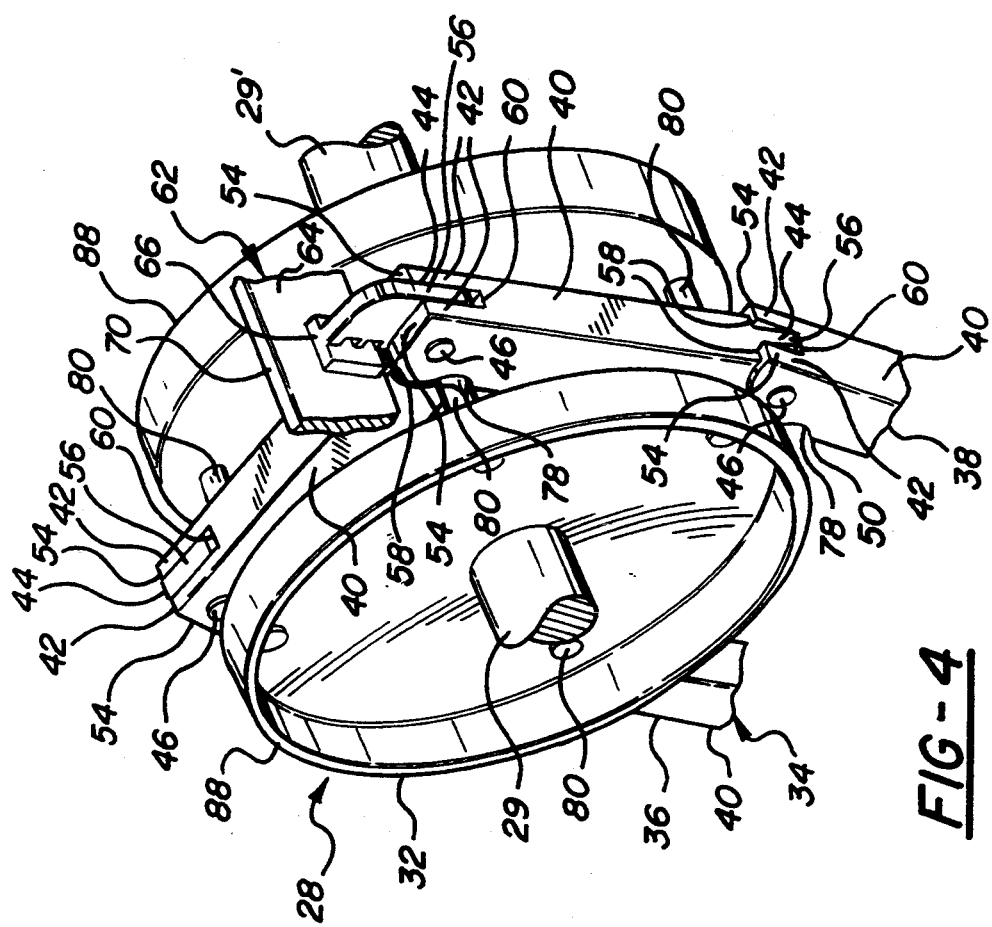
FIG. 4 is an enlarged, perspective, fragmentary view of the drive drum and chain connection.

Each of the links 40 is provided with two arcuate notches 78, one adjacent each end. As the chains 34 are carried around their sprockets 32, the links making the turn are caused to pivot in the direction of arrow B bringing the notches 78 of adjacent links nearer to one another. Each of the sprockets 32 has a plurality of circumferentially spaced, transverse drive pins 80 which removably may be captured in two notches 78 of two adjacent, pivotally adjusted links and are so spaced as to provide a non-slip drive coupling between the chains 34 and the drums 32, as illustrated in FIG. 4.

In the operation of the apparatus 10 as thus far described, the drum 32 is rotated in the direction of arrow A so that the downstream chain flight or run 38 moves upwardly at a low rate of speed. Due to the inclination of the screen rods 16 and the relative positioning of the drum 32, the free edge 70 of each successive scraper blade 64 is urged by gravity and stream flow against the screen rods 16 so as to scrape material off the screen rods 16 and carry such material upwardly. As each successive scraper blade 64 begins to make the turn around the drum 32, it will assume a vertical position at a point in the turn that is downstream, i.e., to the right, of the rotary shaft 29, as illustrated in FIG. 4, thereby enabling debris supported by such blade to fall by gravity into a deflecting shield 82 which deflects the debris toward a receiver or trough 84 mounted atop the pump house 12. The receiver 84 may be fitted with an auger or other device (not shown) for moving the material out of the receiver for disposal.

Figure 3:
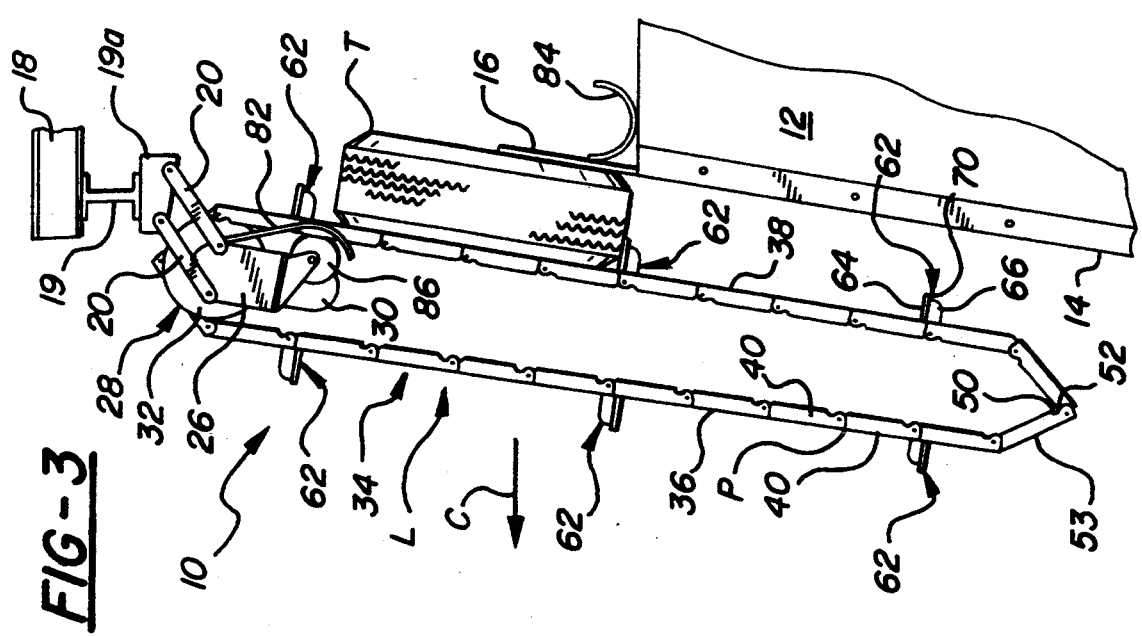
FIG. 3 is a reduced scale view similar to FIG. 1, but showing upstream deflection of the apparatus to accommodate an oversized object between the screen and the chains.

As illustrated in FIG. 1, the engagement of the screen 14 by the blades 64 normally maintains the upward run 38 of the chains at a uniform spaced distance upstream from the screen 14 so as to define a gap G therebetween which is wide enough to accommodate most debris such as leaves, grass, small limbs, and the like. However, should a large object T (FIG. 3) such as a stump, tire, or large tree limb become lodged against the upstream surface of the stream 14, the entire chain assembly can swing upstream, or away from the screen in the direction of arrow C, so as to widen the gap between the chain and screen by whatever amount is necessary to accommodate such object. The scraper blade 64 may then either pass by the object or carry the object upwardly to the receiver 84 for disposal.

The upstream deflection of the chain assembly is due in part to the construction of the chains which enables them freely to be hung or suspended from the drum 32 without the provision of a lower turning drum. The pivotal mounting of the drum 32 on the support 19 also enables the upper end of the chain and the drive assembly to rock both upstream and downstream.

A pair of rollers 86 depends from the housing 26 at a level below that of the axis of the drum and each roller rides on the inner surface of the associated chain 34 along its upward run 38. If a large object is engaged by a scraper blade 64 and carried upwardly, the rollers 86 cause the drum and the drive assembly to deflect in the direction of arrow C without affecting the presentation of the chain to the drum 32.

Figure 6:
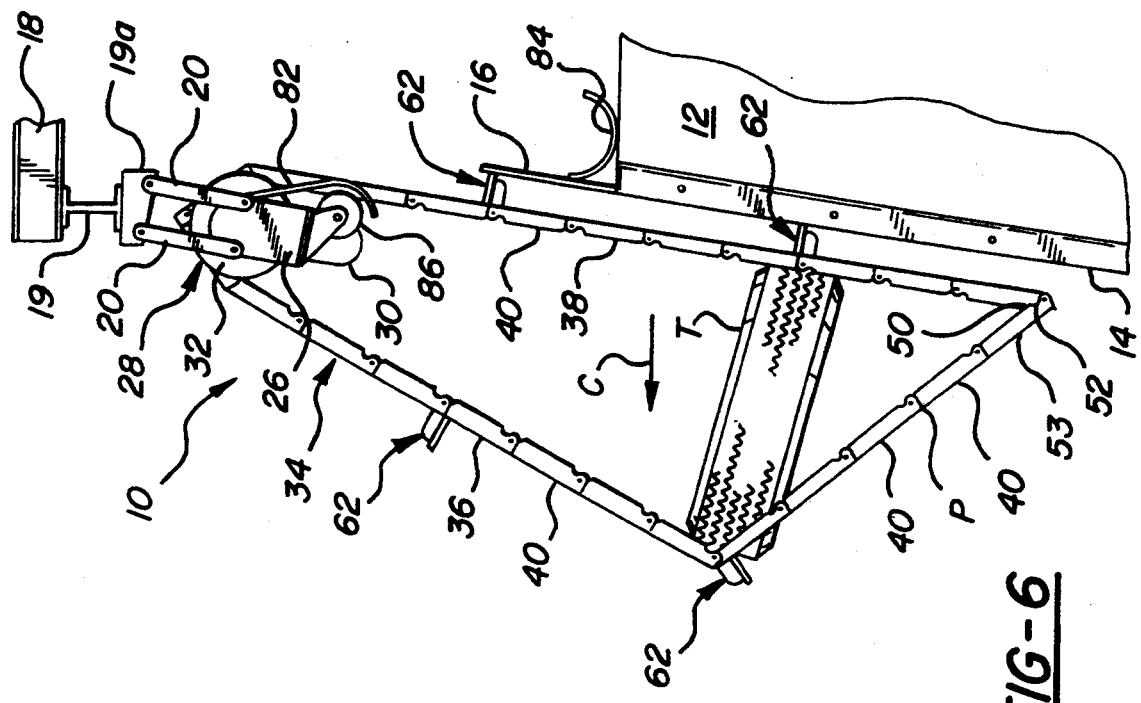
FIG. 6 is a view like FIG. 3 but illustrating upstream flexure of the downward chain run to accommodate the passage of a large object caught between the upward and downward runs of the chain.

Should a large object, such as a tire, position itself between the upward and downward runs of the chain, as shown in FIG. 6, such object could be engaged by two of the scraper blades 64 as they pass one another in traversing the upward and downward runs. The ability of the chains 34 to pivot in one direction only from positions in linear prolongation of one another enables the downwardly moving run 36 to flex away from the run 38 in the direction of arrow C so as to enlarge the space between the runs until such time as the blades distance themselves sufficiently to release the object. The lower transition zone of the runs, or the bottom of the loop, is free to move upwardly to accommodate such expansion. Once released, gravity will return the chains to the normal operative position illustrated in FIG. 1.

The scraper blades 64 may be selected from a number of different configurations, depending on the usage. For instance, the free edge 70 of a blade may be flat, as illustrated, or notched so that projections of the blade extend into the space between the screen rods. The free edge 70 also may be provided with brushes for scrubbing the rods 16 to prevent algae growth and the encrustation of zebra mussels. The chain drive sprockets 32 also may have inwardly tapered guide walls 88 which serve constantly to align the chains 34 with the sprockets 32 should the chains shift to one side or the other during operation in the direction of double headed arrow D in FIG. 2.

The disclosed embodiment is representative of the preferred form of the invention, but is intended to be illustrative rather than definitive thereof. The invention is defined in the claims.

I claim:

1. Apparatus for removing debris from an upright screen occupying a position in a flowing stream, said apparatus comprising:
   a turning drum;
   means mounting said drum at a first level above that of said screen and for rotation about an axis;
   at least one endless chain trained around said drum to transition from an upward run adjacent said screen to a downward run upstream of and spaced from said upward run, said chain being composed of a plurality of adjacent links pivoted to one another at adjacent ends;
   coupling means drivingly coupling said chain to said drum;
   a plurality of scraper blades secured to said chain at spaced intervals;
   means for rotating said drum about said axis in a direction to cause said upward run of said chain to move upwardly and said scraper blades successively to traverse and scrape said screen; and
   pivot limiting means reacting between the adjacent ends of said links for enabling adjacent links to pivot in one direction only from a position in which said adjacent links extend in linear prolongation of one another.

2. Apparatus according to claim 1 wherein the means mounting said drum enables swinging movements of said drum in opposite directions upstream and downstream of said stream.

3. Apparatus according to claim 1 wherein said coupling means comprises circumferentially spaced pins on said drum and notches adjacent opposite ends of each of said links for the accommodation of said pins.

4. Apparatus according to claim 3 wherein the notches in the adjacent ends of adjacent links are so located that one of said pins may be accommodated in the notch at the adjacent end of each of said adjacent links.

5. Apparatus according to claim 1 including receiver means at a level above that of said screen for receiving debris discharged from each of said scraper blades as it moves from said upward run toward said downward run.

6. Apparatus according to claim 1 wherein nothing occupies the space between said upward and downward runs at the transition from said downward run to said upper run.

7. Apparatus according to claim 1 including roller means carried by said drum for engaging said chain adjacent the upper end of said upward run at a level below that of said axis.

8. Apparatus according to claim 1 wherein said pivot limiting means comprise abutments at the ends of each of said links, the abutments at the ends of adjacent links engaging one another when such links are in linear prolongation of one another.

9. Apparatus for removing debris from an upright screen occupying a position in a flowing stream, said apparatus comprising:
   a turning drum;
   means mounting said drum at a first level above that of said screen and for rotation about a horizontal axis;
   a pair of transversely spaced, endless chains each forming a closed loop and trained around said drum to transition from an upward run to a downward run upstream of and spaced from said upward run, each of said chains having a lower transition from said downward run to said upward run at a level below that of said drum, each of said chains being composed of a plurality of adjacent links pivoted to one another at adjacent ends;
   a plurality of scraper blades spanning said chains and joined thereto at spaced intervals;
   coupling means drivingly coupling said chains to said drum;
   means for rotating said drum about said axis to cause said upward run to move upwardly and enable said scraper blades successively to traverse and scrape said screen; and
   pivot limiting means reacting between adjacent ends of each of said links for enabling adjacent links to pivot in one direction only from a position in which said adjacent links extend in linear prolongation of one another, said pivot limiting means enabling said runs to be substantially parallel to one another and swingable together about said axis in a direction upstream from said screen.

10. Apparatus according to claim 9 including means mounting said drum for rocking movements upstream and downstream.

11. Apparatus according to claim 9 wherein nothing occupies the space between said upward and downward runs at said lower transition, thereby enabling the links of each of said chains at said lower transition to move upwardly.

* * * * *